(12) United States Patent
Cavgalar et al.

(10) Patent No.: US 7,792,268 B2
(45) Date of Patent: Sep. 7, 2010

(54) TRUNK ARCHITECTURE FOR COUPLING CENTRAL OFFICES ASSOCIATED WITH PUBLIC SWITCHED TELEPHONE NETWORKS

(75) Inventors: Alexandros Cavgalar, Wichita, KS (US); Robert D. Richmond, Wichita, KS (US); Kenneth R. Stuchlik, Towanda, KS (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1083 days.

(21) Appl. No.: 11/093,876

(22) Filed: Mar. 30, 2005

(65) Prior Publication Data

US 2006/0223583 A1  Oct. 5, 2006

(51) Int. Cl.
*H04M 7/00* (2006.01)
*H04B 7/14* (2006.01)
*H04B 1/38* (2006.01)
*H04J 3/00* (2006.01)

(52) U.S. Cl. .................. 379/219; 379/220.01; 379/333; 370/279; 370/280; 455/16; 455/560

(58) Field of Classification Search ................. 370/279, 370/280; 379/219, 220.01, 333; 455/16, 455/560
See application file for complete search history.

(56) References Cited

U.S. PATENT DOCUMENTS

| 6,188,912 | B1 * | 2/2001 | Struhsaker et al. | 455/561 |
| 6,523,068 | B1 * | 2/2003 | Beser et al. | 709/238 |
| 7,079,500 | B2 * | 7/2006 | Menon | 370/310 |
| 2004/0176129 | A1 * | 9/2004 | Menon et al. | 455/554.1 |
| 2006/0083199 | A1 * | 4/2006 | Yang | 370/331 |
| 2006/0146797 | A1 * | 7/2006 | Lebizay | 370/352 |

\* cited by examiner

*Primary Examiner*—Curtis Kuntz
*Assistant Examiner*—Mohammad K Islam
(74) *Attorney, Agent, or Firm*—Hitt Gaines P.C.

(57) ABSTRACT

The present invention provides a wireless backbone for use with a public switched telephone network (PSTN). In one embodiment, the wireless backbone includes a central office switch coupled to the PSTN and configured to process a plurality of calls associated with the PSTN. Additionally, the wireless backbone also includes a wireless transmission unit coupled to the central office switch and configured to cooperate with another wireless transmission unit to yield a wireless trunk for communicating the plurality of calls to another central office switch.

16 Claims, 3 Drawing Sheets

TRUNK ARCHITECTURE FOR COUPLING CENTRAL OFFICES ASSOCIATED WITH PUBLIC SWITCHED TELEPHONE NETWORKS

TECHNICAL FIELD OF THE INVENTION

The present invention is directed, in general, to a communication network and, more specifically, to a wireless backbone, a method of providing a wireless backbone and a telecommunication network employing the backbone or the method.

BACKGROUND OF THE INVENTION

Originally the public switched telephone network (PSTN) was a network of fixed-line analog telephones, called a plain old telephone system (POTS), which used switchboard operators to connect a calling telephone to a called telephone. As the network grew, central offices emerged that employed mechanical switching arrangements that would automatically connect the calling telephone to the called telephone without human intervention. These circuit-switched interconnections were made through cabling that used a collection of dedicated twisted pair copper wires.

Today, the PSTN is almost entirely digital in structure and includes mobile as well as stationary user stations. The structure of the PSTN is perhaps best viewed in terms of its customer access networks (CANs), which connect customers to local exchanges, and interexchange networks (IENs) that link these local exchanges in major cities to other cities by trunk links. Analog signals from calling units associated with the CAN are digitized at the sending exchange and time division multiplexed to allow multiple calls to use a single trunk link simultaneously. At the receiving exchange, these digitized signals are demultiplexed and converted to analog form again for transmission through the CAN to the called unit.

Typically, CANs connect customers to local exchanges using copper wire. However, trunk links and international links for IENs often use digital transmission over optical fiber due to the high aggregate data rates required (up to 2.4 gigabits per second on main trunk routes). The synchronous digital hierarchy (SDH) is a standard architecture, having a primary bit rate of 155 megabits per second, being used to accommodate the higher data rate requirements associated with IENs. However, the enhanced data rate capability of SDH equipment is achieved at a considerable cost of installation and maintenance and the physical inconvenience of laying additional cabling.

Currently, circuit-switched networks use various SDH technologies such as T1/E1/J1 Line Interface Units (LIUs) to provide internal interconnections and to connect to other routers such as media gateway routers. SDH standards dictate that these T1/E1/J1 LIUs contain packet overhead frame structures for identification purposes. Additionally, gateway routers then use additional IP/UDP or other required packet headers with these frames thereby adding significantly to overhead on the transported data. These applications required heavy frame structure, byte-alignment, and synchronous signaling, which are non-transparent header additions that reduce data transfer capabilities. Additionally, they also require the use of wireline infrastructure such as SDH approved cables and equipment thereby making applications problematical for many geographical terrains.

Accordingly, what is needed in the art is an enhanced way to provide trunk links that overcome these limitations.

SUMMARY OF THE INVENTION

To address the above-discussed deficiencies of the prior art, the present invention provides a wireless backbone for use with a public switched telephone network (PSTN). In one embodiment, the wireless backbone includes a central office switch coupled to the PSTN and configured to process a plurality of calls associated with the PSTN. Additionally, the wireless backbone also includes a wireless transmission unit coupled to the central office switch and configured to cooperate with another wireless transmission unit to yield a wireless trunk for communicating the plurality of calls to another central office switch.

In another aspect, the present invention provides a method of providing a wireless backbone for use with a public switched telephone network (PSTN). The method includes processing a plurality of calls associated with the PSTN employing a wireless transmission unit coupled to a central office switch, and cooperating with another wireless transmission unit to yield a wireless trunk for communicating the plurality of calls to another central office switch.

The present invention also provides, in yet another aspect, a telecommunication network. The telecommunication network includes first and second public switched telephone networks (PSTNS) and a wireless backbone. The wireless backbone has a first central office switch coupled to the first PSTN that processes a plurality of calls associated with the first PSTN. The wireless backbone also has a first wireless transmission unit coupled to the first central office switch that cooperates with a second wireless transmission unit to yield a wireless trunk for communicating the plurality of calls to a second central office switch coupled to the second PSTN.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
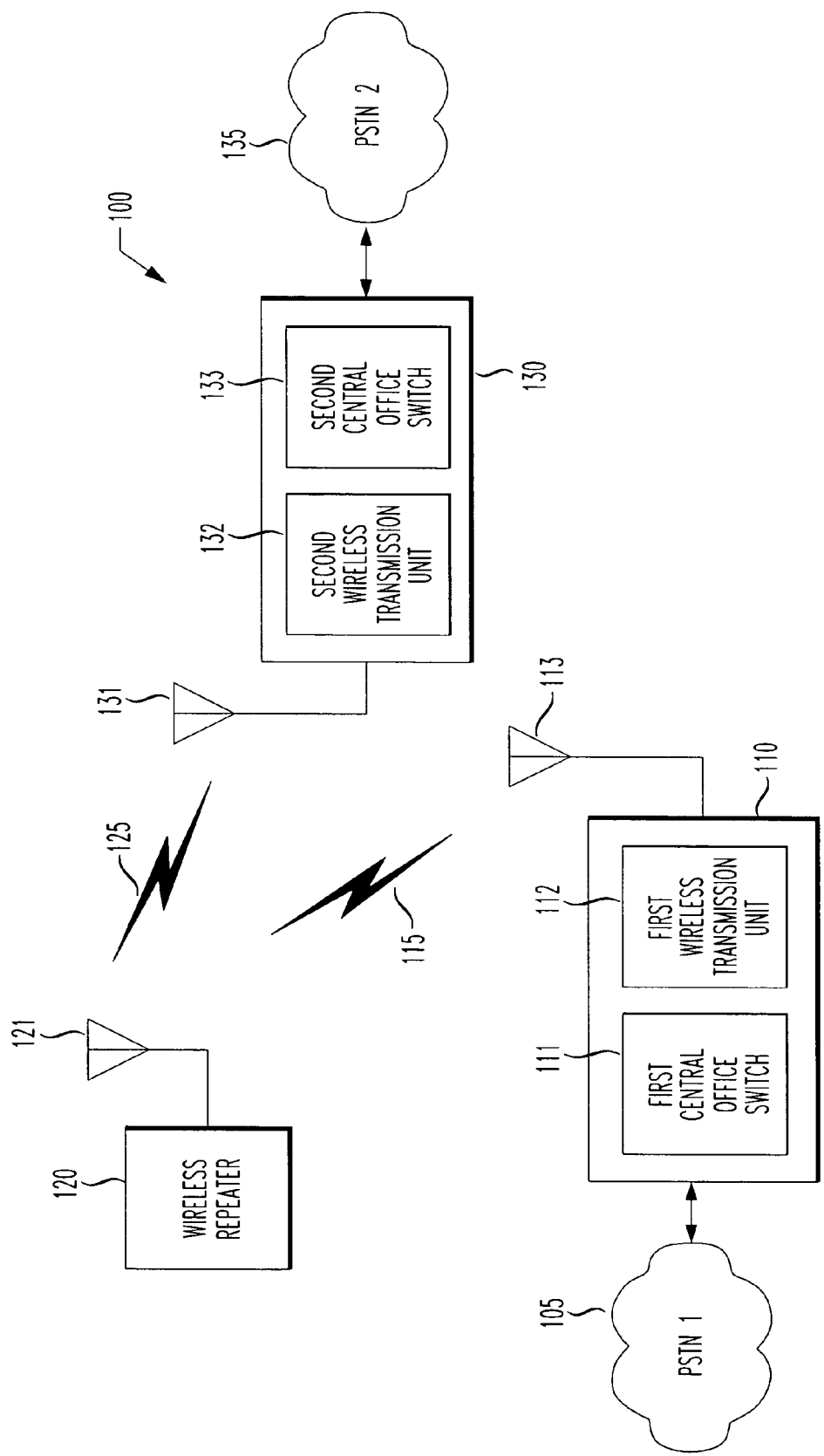
FIG. 1 illustrates a network diagram of an embodiment of a telecommunication network constructed in accordance with the principles of the present invention.

Referring initially to FIG. 1, illustrated is a network diagram of an embodiment of a telecommunication network, generally designated 100, constructed in accordance with the principles of the present invention. The telecommunication network 100 includes first and second public switched telephone networks PSTN1, PSTN2 coupled to first and second central offices 110, 130, respectively. The first central office 110 includes a first central office switch 111, which is coupled to a first wireless transmission unit 112 having a first antenna 113. Similarly, the second central office 130 includes a second central office switch 133, which is coupled to a second wireless transmission unit 132 having a second antenna 131.

The telecommunication network 100 also includes a wireless repeater 120 that supports first and second wireless communications 115, 125 between the first and second central offices 110, 130, respectively. These three units form a wireless backbone for the illustrated embodiment. The first and second wireless transmission units 112, 132 and the wireless repeater 121 provide a wireless trunk between the first and second central offices 110, 130. The wireless trunk accommodates a plurality of calls between the first and second public switched telephone networks PSTN1, PSTN2. The first and second central office switches 111, 133 manage interactions with the first and second public switched telephone networks PSTN1, PSTN2, respectively. Additionally they respectively employ time division multiplexed (TDM) signals between the first and second wireless transmission units 112, 132.

In the illustrated embodiment, the first and second wireless transmission units 112, 132 and the wireless repeater 120 conform to one of the family of IEEE 802.16 standards, which is commonly referred to as "WiMAX". Architecturally the wireless trunk performs as a traditional cell-based TDM infrastructure but avoids the high cost of set up and maintenance associated with a plesiosynchronous digital hierarchy network as well as full packet networks (e.g., VLAN, MPLS, SONET, IP and UDP). This embodiment allows circuit-switched networks to communicate with each other as well as TDM-based backhaul routers without utilizing wireline trunk connections. This architecture is especially attractive in areas where geographical terrain mitigates against the use of wireline communications.

Utilizing the IEEE 802.16 WiMAX wireless communication standard allows for creation of a substantially transparent and seamless communication structure employing a streamed-bit transmission. The WiMAX Media Access Control (MAC) receives input payload blocks from one of the central office switches and then adds a single WiMAX header to the entire payload for transmission. At the receiving end, the blocks are reassembled and supplied to the other central office switch for distribution. Additionally, the wireless trunk provides a communication path utilizing radio frequency signals not having line-of-sight restrictions for retransmission distances of up to 48 kilometers.

The wireless repeater 120 relays transmissions between the first and second central offices 110, 130 when they are greater than 48 kilometers apart. Another embodiment of the present invention employs an appropriate number of additional WiMAX wireless transmission units as repeaters that are spaced less than 48 kilometers apart, thereby providing a wireless repeater chain. Of course, the wireless repeater 120 may be a custom repeater designed to accommodate WiMAX transmission units that allows greater separations of the first and second central offices 110, 130 than a standard WiMAX unit can accommodate.

Figure 2:
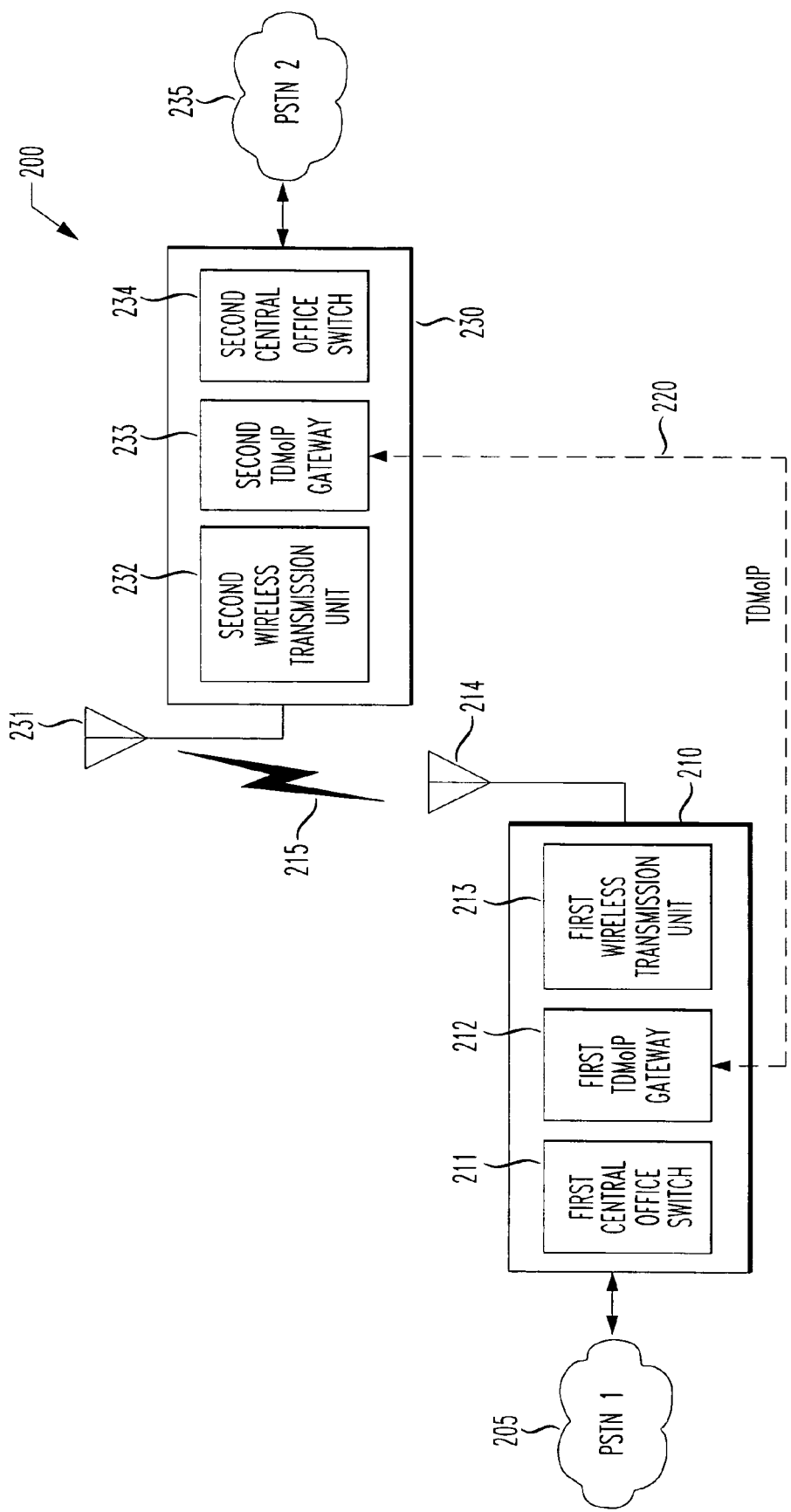
FIG. 2 illustrates a network diagram of an alternative embodiment of a telecommunication network constructed in accordance with the principles of the present invention.

Turning now to FIG. 2, illustrated is a network diagram of an alternative embodiment of a telecommunication network, generally designated 200, constructed in accordance with the principles of the present invention. The telecommunication network 200 includes first and second public switched telephone networks PSTN1, PSTN2 coupled to first and second central offices 210, 230, respectively. The first central office 210 includes a first central office switch 211, which is coupled to a first time division multiplex over Internet protocol (TDMoIP) gateway 212 and a first wireless transmission unit 213 having a first antenna 214. Similarly, the second central office 230 includes a second central office switch 234, which is coupled to a second TDMoIP gateway 233 and a second wireless transmission unit 232 having a second antenna 231. The first and second antennas 214, 231 provide a wireless communication 215 between the first and second central offices 210, 230, respectively.

In the alternative embodiment of FIG. 2, The first and second wireless transmission units 213, 232 provide a portion of a wireless trunk between the first and second central offices 210, 230, which may also be used to accommodate a plurality of calls between the first and second public switched telephone networks PSTN1, PSTN2. Again, the first and second wireless transmission units 213, 232 conform to one of the family of IEEE 802.16 standards, although other wireless transmission structures may also be employed in other embodiments as an application may dictate. Of course, one or more wireless repeaters may be employed as part of the wireless trunk as may be dictated by a particular application.

The first and second TDMoIP gateways 212, 233 provide another portion of the wireless trunk by allowing a virtual bridge 220 between the first and second central offices 210, 230. The virtual bridge 220 allows encapsulation of cell-based structures inside of IP-based structures thereby virtually creating a bridge between the two. Utilization of time division multiplexing gateway (TDMG) processors, which typically may be based on current ITU-Y.1413 standards, in conjunction with WiMAX based on the IEEE 802.16 wireless communication standard, reduces the requirements related to frame structure, byte alignment, and signaling in transmission and reception over the wireless trunk. This allows creation of a substantially transparent streamed-bit transmission.

The first and second TDMoIP gateways 212, 233 receive input data in a manner similar to time slot interchangers where portions of the input blocks are transferred one after another until an entire payload is transferred. The WiMAX Media Access Control (MAC) then adds a WiMAX header to this entire payload. At the receiving end, the blocks are reassembled and transmitted to their destination ports. The packet sizes can be flexible depending on slot length or time, which may be set at the TDMoIP gateways 212, 233.

A significant benefit of using the wireless trunk as embodied in FIG. 2, is the capability of providing managed packet-switched networks (PSNs) in close proximity to unmanaged PSNs or mixed PSNs such as the Internet. This capability allows Internet service providers to communicate inside their network easily without the use of expensive packet routers or additional landlines.

Figure 3:
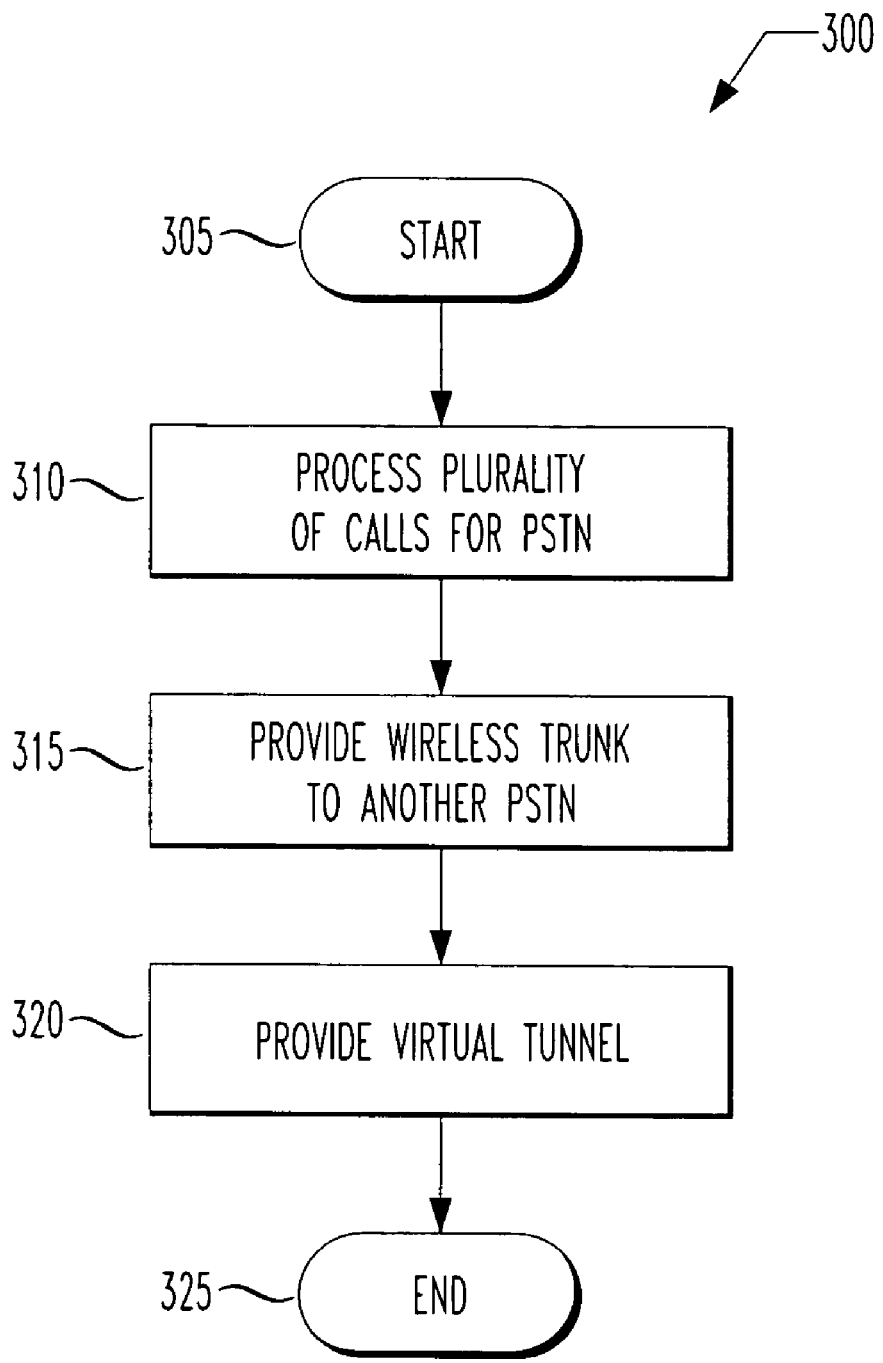
FIG. 3 illustrates a flow diagram of an embodiment of a method of providing a wireless backbone carried out in accordance with the principles of the present invention.

Turning now to FIG. 3, illustrated is a flow diagram of an embodiment of a method of providing a wireless backbone, generally designated 300, carried out in accordance with the principles of the present invention. The method 300 is for use with a PSTN and starts in a step 305. Then, in a step 310, a plurality of calls is processed employing a central office switch, coupled to the PSTN, using a time division multiplex structure and a wireless transmission unit. The wireless transmission unit in the step 310 cooperates with another wireless transmission unit in a step 315 to yield a wireless trunk for communicating the plurality of calls to another central office switch associated with another PSTN.

Each of the wireless transmission units conforms to an IEEE 802.16 specification and the wireless trunk may also employ one or more wireless repeaters as required by a particular application. The wireless trunk provides a substantially seamless communication structure for communicating the plurality of calls and further provides a virtual tunnel for employing time division multiplex over Internet protocol gateways in a step 320. The method 300 ends in a step 325.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or grouping of the steps is not a limitation of the present invention.

In summary, embodiments of the present invention employing a wireless backbone, a method of providing a wireless backbone and a telecommunication network employing the backbone or the method have been presented. Advantages of employing the wireless trunk and using wireless transmission units based on WiMAX technology include eliminating the need for wireline structures, which typically include SDH approved cables and components. Additionally, the wireless trunk facilitates the deployment of required infrastructure, particular in areas where geographical terrain would make wireline either too expensive or its installation virtually impossible. Embodiments of the wireless trunks presented reduce the requirements related to frame structure, byte alignment, and signaling in transmission and reception thereby allowing substantially seamless payload transmission and deployment of TDM-based connections across managed PSNs.

Although the present invention has been described in detail, those skilled in the art should understand that they can make various changes, substitutions and alterations herein without departing from the spirit and scope of the invention in its broadest form.

What is claimed is:

1. A telecommunication network, comprising:
    a first public switched telephone network (PSTN);
    a first central office coupled to said first PSTN, said first central office including a first central office switch for managing interactions with and processing a first plurality of calls associated with said first PSTN;
    a second PSTN;
    a second central office coupled to said second PSTN, said second central office including a second central office switch for managing interactions with and processing a second plurality of calls associated with said second PSTN; and
    a wireless trunk, said wireless trunk including:
        a first wireless transmission unit in said first central office coupled to said first central office switch; and
        a second wireless transmission unit in said second central office coupled to said second central office switch;
        wherein said first transmission unit cooperates with said second transmission unit to communicate said first plurality of calls to said second PSTN and to communicate said second plurality of calls to said first PSTN.

2. The network as recited in claim 1 wherein said first and second wireless transmission units conform to an IEEE 802.16 specification.

3. The network as recited in claim 1 wherein said wireless trunk employs at least one wireless repeater for communicating both said plurality of calls.

4. The network as recited in claim 3 wherein said at least one wireless repeater is an additional wireless transmission unit.

5. The network as recited in claim 1 wherein said wireless trunk provides a substantially seamless communication structure for communicating both said plurality of calls.

6. The network as recited in claim 1 wherein both said plurality of calls employ a time division multiplex structure.

7. The network as recited in claim 1 wherein said wireless trunk provides a virtual tunnel for time division multiplexing over Internet Protocol (IP) gateways associated with said first and second wireless transmission units.

8. The network as recited in claims 7 wherein said virtual tunnel allows encapsulation of cell-based structures of both of said plurality of calls inside of IP-based structures.

9. A method of accommodating a plurality of calls between a first and second public switched telephone network (PSTN) using a wireless trunk, comprising:
    processing a first plurality of calls associated with said first PSTN employing a first central office switch of a first central office, said first central office switch managing interactions with said first PSTN, and said first central office also including a first wireless transmission unit;
    processing a second plurality of calls associated with said second PSTN employing a second central office switch of a second central office; said second central office switch managing interactions with said second PSTN, and said second central office also including a second wireless transmission unit; and
    cooperating, by said first and second transmission units, to yield said wireless trunk for communicating said first plurality of calls to said second PSTN and for communicating said second plurality of calls to said first PSTN.

10. The method as recited in claim 9 wherein said wireless transmission units conform to an IEEE 802.16 specification.

11. The method as recited in claim 9 wherein said wireless trunk employs at least one wireless repeater for communicating both said plurality of calls.

12. The method as recited in claim 11 wherein said at least one wireless repeater is an additional wireless transmission unit.

13. The method as recited in claim 9 wherein said wireless trunk provides a substantially seamless communication structure for communicating both said plurality of calls.

14. The method as recited in claim 9 wherein both said plurality of calls employ a time division multiplex structure.

15. The method as recited in claim 9 wherein said wireless trunk provides a virtual tunnel for time division multiplexing over Internet Protocol (IP) gateways associated with said first and second wireless transmission units.

16. The method as recited in claim 15 wherein said virtual tunnel allows encapsulation of cell-based structures of both of said plurality of calls inside of IP-based structures.

* * * * *